United States Patent
Terrill et al.

(10) Patent No.: US 12,552,118 B2
(45) Date of Patent: Feb. 17, 2026

(54) SYSTEM AND METHOD FOR MAKING A BAND AND TREAD ASSEMBLY FOR A NON-PNEUMATIC TIRE

(71) Applicant: Bridgestone Bandag, LLC, Nashville, TN (US)

(72) Inventors: Wade L. Terrill, Letts, IA (US); Merle R. Schlapkohl, Durant, IA (US); Alexander G. Tomtschik, Muscatine, IA (US); Chad M. Zeck, Muscatine, IA (US); Terry A. Westaway, Conesville, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 0 days.

(21) Appl. No.: 18/716,741

(22) PCT Filed: Dec. 14, 2022

(86) PCT No.: PCT/US2022/081488
§ 371 (c)(1),
(2) Date: Jun. 5, 2024

(87) PCT Pub. No.: WO2023/129809
PCT Pub. Date: Jul. 6, 2023

(65) Prior Publication Data
US 2025/0033305 A1    Jan. 30, 2025

Related U.S. Application Data

(60) Provisional application No. 63/295,563, filed on Dec. 31, 2021.

(51) Int. Cl.
*B29D 30/02* (2006.01)
*B29D 30/52* (2006.01)

(52) U.S. Cl.
CPC ............. *B29D 30/02* (2013.01); *B29D 30/52* (2013.01)

(58) Field of Classification Search
CPC .......................... B29D 30/02; B29D 30/0061; B29D 30/0601; B29D 30/0662; B29D 30/242;
(Continued)

(56) References Cited

U.S. PATENT DOCUMENTS 3,884,740 A * 5/1975 Schelkmann ........ B29D 30/542
156/96
4,129,474 A * 12/1978 Martin ................. B29D 30/542
301/14
(Continued)

FOREIGN PATENT DOCUMENTS

JP   2011-056693   3/2011
JP   2017-165119   9/2017
(Continued)

OTHER PUBLICATIONS

Berggren B, SE-439450-B, machine translation. (Year: 1985).*
(Continued)

*Primary Examiner* — Sedef E Paquette
(74) *Attorney, Agent, or Firm* — Shaun J. Fox; Bryan J. Jaketic

(57) ABSTRACT

A system for assembling a circumferential tread and a band for a non-pneumatic tire includes a curing wrap dimensioned to receive a band for a non-pneumatic tire and a circumferential tread. The curing wrap includes a valve. The system also includes a fastener configured to secure a first side of the curing wrap to the circumferential tread and to secure a second side of the curing wrap to the first side of the curing wrap.

20 Claims, 4 Drawing Sheets

(58) Field of Classification Search
CPC ...... B29D 30/52; B29D 30/54; B29D 30/542; B29D 30/56; B29D 2030/0666; B29D 2030/067; B29D 2030/0671; B29D 2030/0673; B29D 2030/0674; B29D 2030/523; B29D 2030/543; B29D 2030/547
USPC .......................................... 156/94, 112, 113
See application file for complete search history.

(56) References Cited

U.S. PATENT DOCUMENTS

| | | | |
|---|---|---|---|
| 4,272,309 A | * | 6/1981 | Payne ................ B29D 30/52 264/225 |
| 4,720,313 A | * | 1/1988 | Wegehaupt .......... B29C 73/325 425/14 |
| 4,756,678 A | | 7/1988 | Magee |
| 4,808,256 A | | 2/1989 | Hill |
| 4,946,554 A | | 8/1990 | Magee |

FOREIGN PATENT DOCUMENTS

| | | | | |
|---|---|---|---|---|
| JP | 2019081299 | | 5/2019 | |
| JP | 2020175878 | | 10/2020 | |
| SE | 439450 B | * | 6/1985 | ............ B29D 30/54 |

OTHER PUBLICATIONS

International Search Report & Written Opinion; Corresponding PCT Application No. PCT/US2022/081488; Authorized Officer Park, Tae Wook; Apr. 19, 2023.

* cited by examiner

SYSTEM AND METHOD FOR MAKING A BAND AND TREAD ASSEMBLY FOR A NON-PNEUMATIC TIRE

FIELD OF INVENTION

The present disclosure relates to a non-pneumatic tire and a system and a method of making the same. More specifically, the present disclosure relates to a system and method of applying a tread to a band for a non-pneumatic tire.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects a lower ring to an upper ring. It is known to adhere a pre-cured tread to an upper ring of a non-pneumatic with adhesive or cement.

SUMMARY OF THE INVENTION

In one embodiment, a method of making a band and tread assembly for a non-pneumatic tire includes providing a band and providing an elastomeric tread circumferentially about a top surface of the band. The method further includes providing a flexible wrap having a valve extending therefrom. The flexible wrap has a first end and a second end. The method also includes placing the flexible wrap about the band and the elastomeric tread, such that the first end overlaps the second end. The method further includes securing the flexible wrap about the band and the elastomeric tread, and applying heat within the flexible wrap.

In another embodiment, a system for assembling a circumferential tread and a band for a non-pneumatic tire includes a curing wrap dimensioned to receive a band for a non-pneumatic tire and a circumferential tread. The curing wrap includes a valve. The system also includes a fastener configured to secure a first side of the curing wrap to the circumferential tread and to secure a second side of the curing wrap to the first side of the curing wrap.

In yet another embodiment, a method of making a non-pneumatic tire includes providing an upper band, and providing an elastomeric tread circumferentially about a top surface of the upper band. The method further includes securing a curing wrap about the elastomeric tread and the upper band, and applying heat within the curing wrap to form an upper band and tread assembly. The method also includes providing a support structure connected to a lower band, and affixing the upper band and tread assembly to the support structure.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale, and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
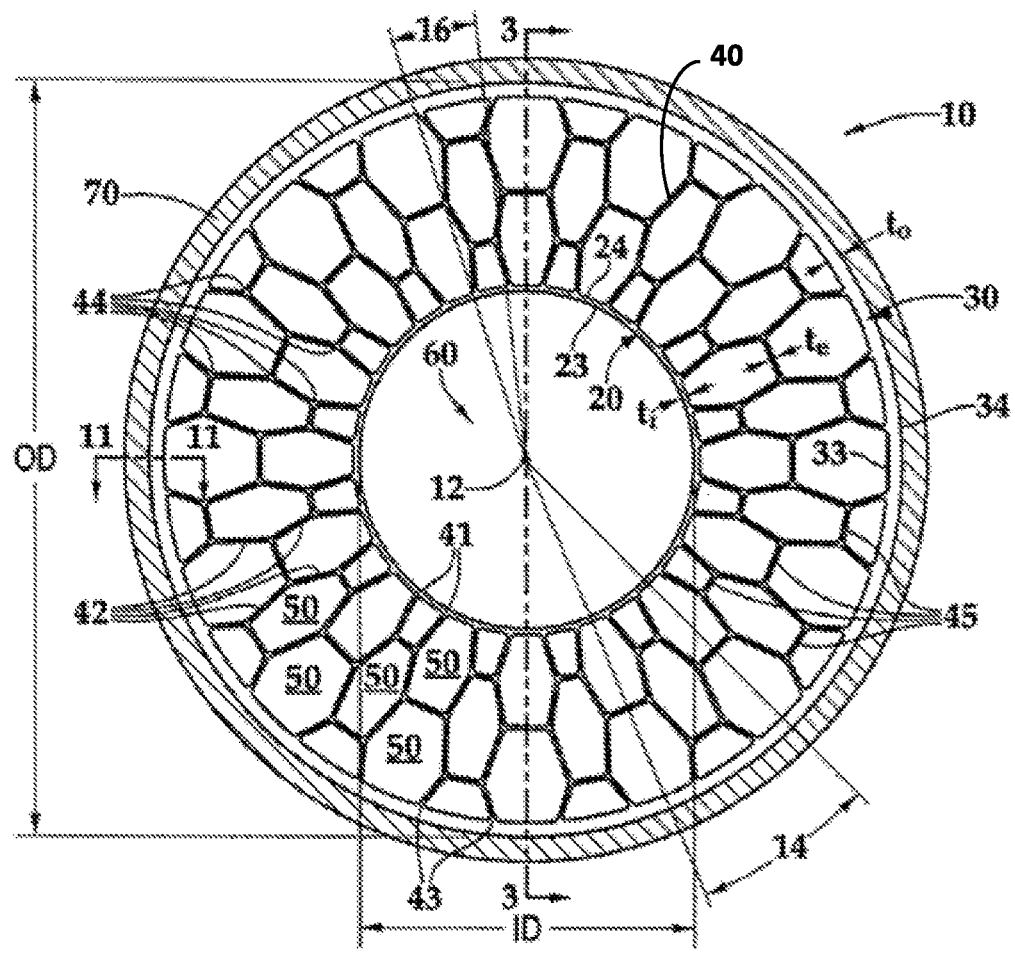
FIG. 1 is a front view of one embodiment of a non-pneumatic tire.

FIG. 1 illustrates one embodiment of a non-pneumatic tire 10. The non-pneumatic tire 10 is merely an exemplary illustration and is not intended to be limiting. In the illustrated embodiment, the non-pneumatic tire 10 includes a generally annular lower ring 20 that engages a rim (not shown) to which the tire 10 is mounted. The generally annular lower ring 20 has an internal surface 23 and an external surface 24 and can be made of an elastomeric material or metal.

The non-pneumatic tire 10 further includes a generally annular upper ring 30 surrounding an interconnected web 40, which is a support structure connected to the generally annular lower ring 20. In alternative embodiments, a plurality of spokes or other support structure connects the lower ring to the upper ring. The upper ring 30 can be configured to deform in an area 48 around and including a footprint region 32, which decreases vibration and increases ride comfort.

In one embodiment, the generally annular lower ring 20 and the generally annular upper ring 30 are made of the same material as interconnected web 40. In one particular embodiment, each of the lower ring 20, upper ring 30, and web 40 are constructed of steel. In alternative embodiments, each of the lower ring 20, upper ring 30, and web 40 are constructed of other metal, carbon fiber, resin, or a polymeric material such as polyurethane, polyester, nylon, or polyvinyl chloride (PVC). It should be understood, however, that other materials may be used and the rings and spokes are not limited to the listed materials.

In an alternative embodiment, at least one of the generally annular lower ring, the generally annular upper ring, and the interconnected web are made of a different material. For example, the upper ring 30 may be a steel band while the lower ring 20 and web 40 are constructed of other metal, carbon fiber, resin, or a polymeric material such as polyurethane, polyester, nylon, or polyvinyl chloride (PVC).

In the illustrated embodiment, the interconnected web 40 has at least two radially adjacent layers 56, 58 of web elements 42 that define a plurality of generally polygonal openings 50. In other embodiments (not shown), other web configurations may be employed.

As shown in FIG. 1, the generally annular upper ring 30 can have a radially external surface 34 to which a circumferential tread 70 is attached. The circumferential tread 70 may be constructed of an elastomeric material, such as natural or synthetic rubber. The tread 70 may have a plurality of circumferential grooves that define a plurality of ribs. It should be understood that the tread may also include tread elements such as lateral grooves, ribs, blocks, lugs, sipes, studs, and other elements. A shear band or other shear element or reinforcement structure (not shown) may be disposed between the upper ring 30 and the tread 70. Alternatively, a shear band or other shear element may be disposed within the tread.

In one embodiment, the circumferential tread 70 is affixed to a top of the upper ring 30, with no pressure-sensitive adhesive disposed between the upper ring 30 and the circumferential tread 70. In one such embodiment, the circumferential tread is 70 bonded directly to the top of the upper ring 30. In another such embodiment, a strip of cured rubber (not shown) or a temperature sensitive adhesive is disposed between the circumferential tread 70 and the upper ring 30.

Figure 2:
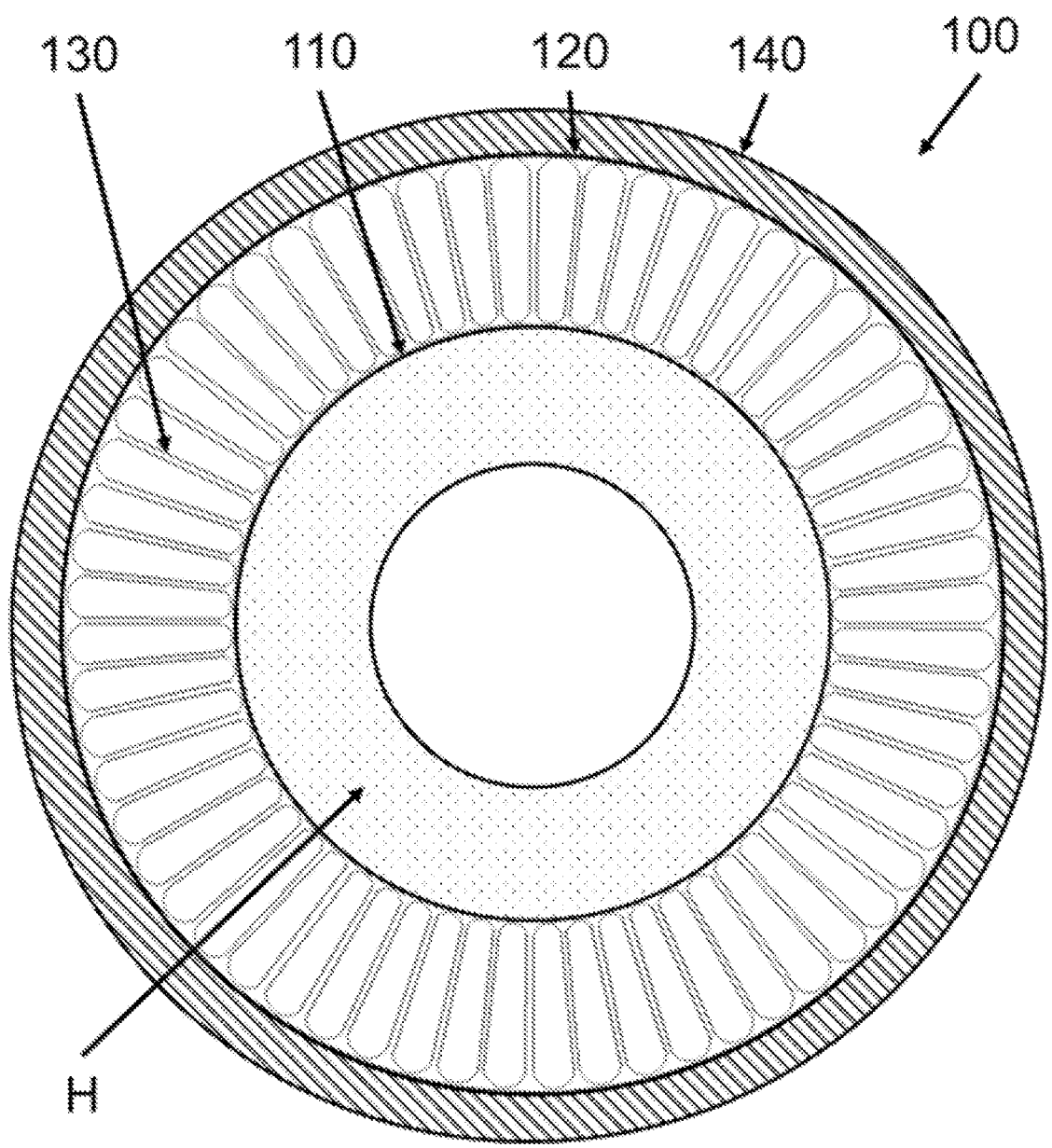
FIG. 2 is a front view of an alternative embodiment of a non-pneumatic tire.

FIG. 2 is a front view of an alternative embodiment of a non-pneumatic tire 100. The non-pneumatic tire 100 includes an inner ring 110 having a first diameter, and an outer ring 120 having a second diameter greater than the first diameter. The outer ring 120 is substantially coaxial with the inner ring 110. In the illustrated embodiment, the inner ring 110 is shown as being attached to a hub H. A plurality of spokes 130 extend between the inner ring 110 and the outer ring 120. It should be understood that the term "support structure" may refer to either webbing (such as the web 40 in FIG. 1) or spokes (such as the spokes 130 in FIG. 2).

In one embodiment, each of the lower ring 110, upper ring 120, and spokes 130 are constructed of the same material. In one particular embodiment, each of the lower ring 110, upper ring 120, and spokes 130 are constructed of steel. In alternative embodiments, each of the lower ring 110, upper ring 120, and spokes 130 are constructed of other metal, carbon fiber, resin, or a polymeric material such as polyurethane, polyester, nylon, or polyvinyl chloride (PVC). It should be understood, however, that other materials may be used and the rings and spokes are not limited to the listed materials.

In an alternative embodiment, one or more of the lower ring 110, upper ring 120, and spokes 130 are constructed of different materials. For example, the upper ring 120 may be a steel band while the lower ring 120 and spokes 130 are constructed of other metal, carbon fiber, resin, or a polymeric material such as polyurethane, polyester, nylon, or polyvinyl chloride (PVC).

A circumferential tread 140 is disposed about the upper ring 120 in the illustrated embodiment. The circumferential tread 140 may be constructed of an elastomeric material, such as natural or synthetic rubber. The tread 140 may have a plurality of circumferential grooves that define a plurality of ribs. It should be understood that the tread may also include tread elements such as lateral grooves, ribs, blocks, lugs, sipes, studs, and other elements. A shear band or other shear element or reinforcement structure (not shown) may be disposed between the upper ring 120 and the tread 140. Alternatively, a shear band or other shear element may be disposed within the tread.

In one embodiment, the circumferential tread 140 is affixed to a top of the upper ring 120, with no pressure-sensitive adhesive disposed between the upper ring 120 and the circumferential tread 140. In one such embodiment, the circumferential tread is 140 bonded directly to the top of the upper ring 120. In another such embodiment, a strip of cured rubber (not shown) or a temperature sensitive adhesive is disposed between the circumferential tread 140 and the upper ring 120.

To make a non-pneumatic tire, such as the tire 10 or tire 100, a manufacturer provides a band (such as upper ring 30 or upper ring 120) and an elastomeric tread (such as tread 70 or tread 140), then wraps the tread about the upper ring. The manufacturer then provides a flexible wrap having a first end and a second end, and places the wrap about the band and the elastomeric tread, such that the first end overlaps the second end. The manufacturer then secures the wrap about the band and the elastomeric tread, and applies heat within the wrap.

After the elastomeric tread has been cured to the band the manufacturer then provides a tire structure that includes a lower ring having a diameter less than the diameter of the band (such as lower ring 20 or lower ring 110), and a support structure (such as web 40 or spokes 130) extending from the lower ring. The manufacturer then affixes the band to the support structure. For example, the manufacturer may affix the band to the support structure with an adhesive, or through a welding or brazing process.

Figure 3:
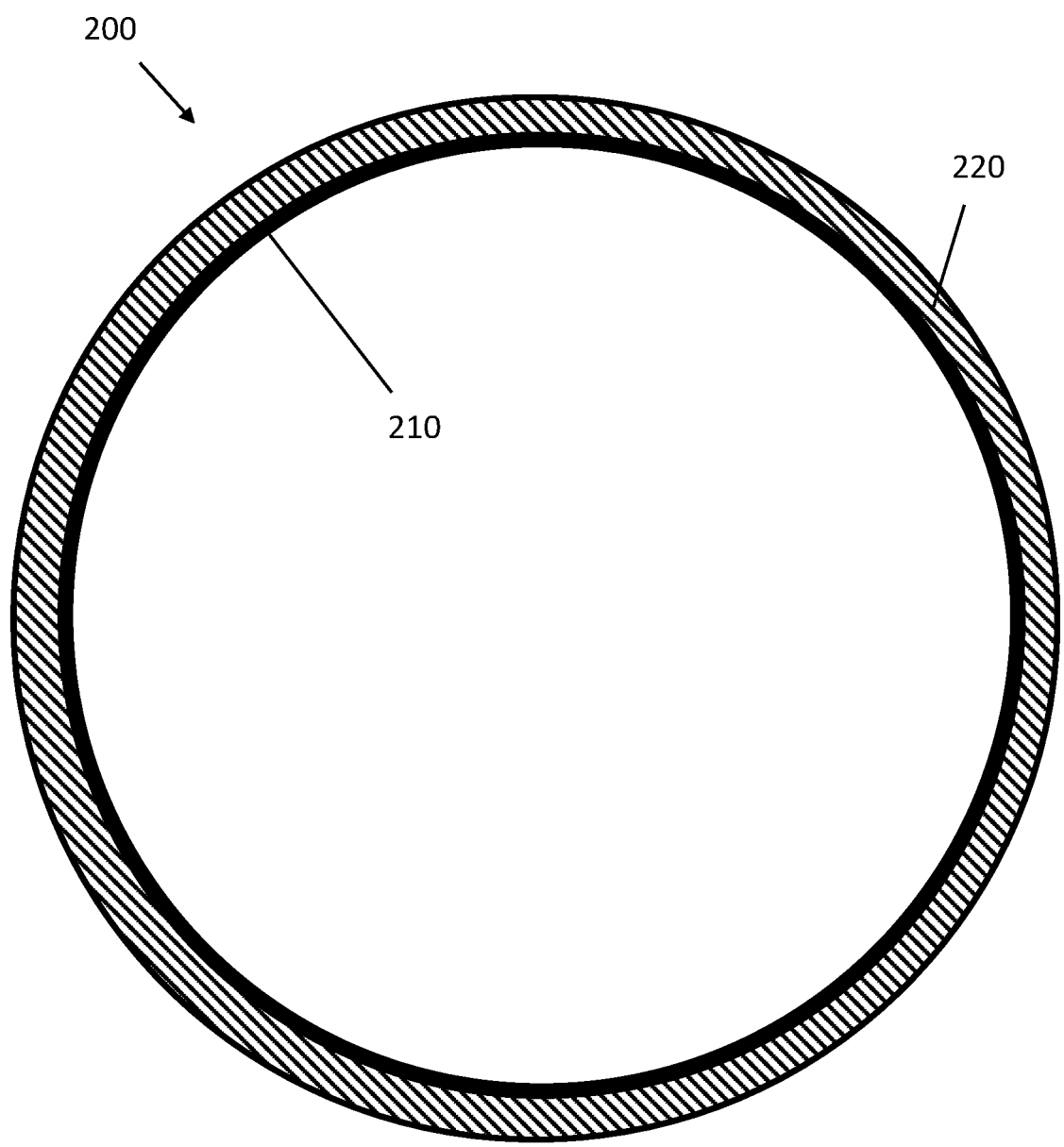
FIG. 3 is a schematic drawing illustrating a font view of one embodiment of a tread and upper band assembly for a non-pneumatic tire.

FIG. 3 is a schematic drawing illustrating a font view of one embodiment of a pre-cured assembly 200 including a band 210 with a tread 220 extending around the circumference of the band. The band 210 may be the same as the upper ring 30 or upper ring 120 of FIGS. 1 and 2. The tread 220 may be the same as the tread 70 or tread 140 of FIGS. 1 and 2, except that it may be in an uncured or partially cured condition. Alternatively, the tread 220 may be a cured tread.

In one embodiment, a strip of green rubber or a temperature sensitive adhesive (not shown) is first applied to either the tread 220 or the band 210. In an alternative embodiment, the tread 220 is directly placed on the band 210.

Figure 4:
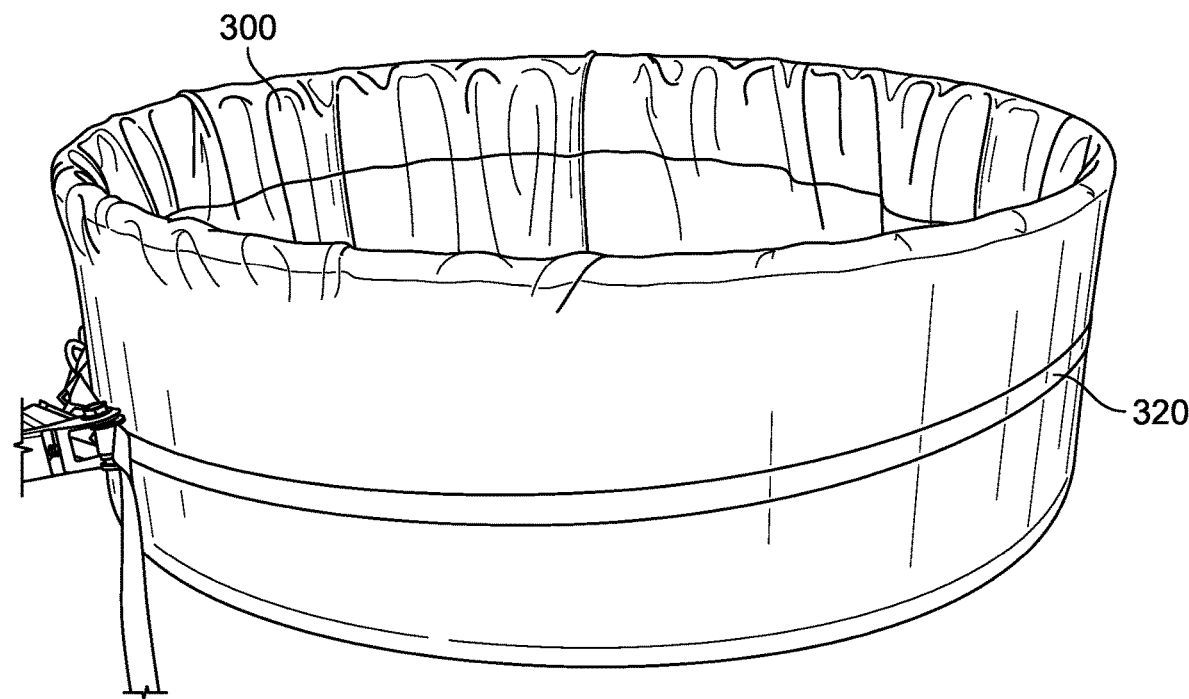
FIG. 4 is a perspective view of a curing wrap secured about a tread and upper band assembly for a non-pneumatic tire.
Figure 5:
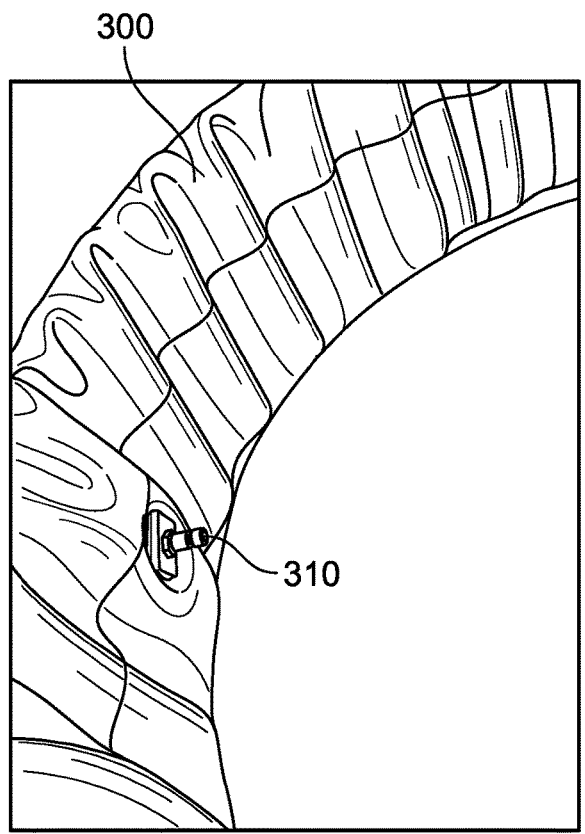
FIG. 5 is a partial perspective view of an interior of the curing wrap secured about the tread and upper band assembly for a non-pneumatic tire.

FIGS. 4 and 5 provide a perspective view and partial perspective view, respectively, of a curing wrap 300 secured about a pre-cured assembly of a tread and upper band assembly for a non-pneumatic tire. The curing wrap 300 is dimensioned to receive a circumferential tread and a band. The curing wrap 300 has a valve 310, a first end, a second end.

The curing wrap 300 may be a sheet of butyl rubber, other rubber compounds, neoprene, polytene, latex, or other flexible materials. The sheet of material may have a thickness between 0.008 inches (0.02 cm) and 0.12 inches (0.3 cm). The curing wrap 300 may also be formed by multiple sheets of material.

The curing wrap 300 is placed about the pre-cured assembly of the band and the elastomeric tread, such that the first end overlaps the second end. In one embodiment, the first side of the curing wrap 300 overlaps the second side of the curing wrap by a distance of 2 to 3 inches (5 to 8 cm). The curing wrap 300 is then secured about the band and the elastomeric tread In the illustrated embodiment, the curing wrap 300 is placed about the pre-cured assembly of the band and the elastomeric tread, such that the first end overlaps the second end above the elastomeric tread. The curing wrap 300 is then secured with a strap 320. In this embodiment, the valve 310 extends below the band in the manner shown in FIG. 5. In an alternative embodiment, the valve may extend above the elastomeric tread.

In an alternative embodiment, the curing wrap is placed about the pre-cured assembly of the band and the elastomeric tread, such that the first end overlaps the second end below the band. In such an embodiment, the curing wrap may be secured by a fastener, such as an arc band. In one such embodiment, the valve may extend above the elastomeric tread. In another embodiment, the valve may extend below the band.

In either embodiment, after the curing envelope is secured to the pre-cured assembly of the band and the elastomeric tread, heat and pressure are applied within the curing envelope. In one embodiment, heat is applied at a temperature between 200° F. and 300° F. (90° C. to 150° C.). The elastomeric tread may be a pre-cured or a partially cured tread, having any desired tread elements pre-formed before the tread is provided about the upper ring. Because the elastomeric tread is pre-cured or partially cured, the tread is only heated to a sufficient temperature to bond the tread to the upper ring.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of making a band and tread assembly for a non-pneumatic tire, the method comprising:
   providing a band;
   providing an elastomeric tread circumferentially about a top surface of the band;
   providing a flexible wrap having a valve extending therefrom, the flexible wrap having a first end and a second end;
   placing the flexible wrap about an inner circumference of the band and an outer circumference of the elastomeric tread such that the first end overlaps the second end;
   securing the flexible wrap about the band and the elastomeric tread; and
   applying heat within the flexible wrap.

2. The method of claim 1, wherein the flexible wrap is placed about the band and the elastomeric tread such that the first end overlaps the second end above the elastomeric tread.

3. The method of claim 2, wherein the securing of the flexible wrap about the band and the elastomeric tread includes securing the flexible wrap with a strap.

4. The method of claim 2, wherein the securing of the flexible wrap about the band and the elastomeric tread includes securing the flexible wrap with an arc band.

5. The method of claim 1, wherein the flexible wrap is placed about the band and the elastomeric tread such that the first end overlaps the second end below the band.

6. The method of claim 1, wherein the flexible wrap is placed about the band and the elastomeric tread such that the valve extends below the band.

7. The method of claim 1, wherein the flexible wrap is placed about the band and the elastomeric tread such that the valve extends above the elastomeric tread.

8. The method of claim 1, further comprising applying pressure within the flexible wrap.

9. The method of claim 1, wherein the flexible wrap is constructed of a material selected from the group consisting of butyl rubber, other rubber compounds, neoprene, polytene, and latex.

10. A system for assembling a circumferential tread and a band for a non-pneumatic tire, the system comprising:
    a curing wrap dimensioned to receive a band for a non-pneumatic tire and a circumferential tread such that the curing wrap contacts a lower surface of the band and an upper surface of the circumferential tread, the curing wrap including a valve; and
    a fastener configured to secure a first side of the curing wrap to the circumferential tread and to secure a second side of the curing wrap to the first side of the curing wrap.

11. The system of claim 10, wherein the fastener is a strap.

12. The system of claim 10, wherein the curing wrap is constructed of a material selected from the group consisting of butyl rubber, other rubber compounds, neoprene, polytene, and latex.

13. The system of claim 10, wherein the first side of the curing wrap overlaps the second side of the curing wrap.

14. The system of claim 13, wherein the first side of the curing wrap overlaps the second side of the curing wrap by a distance of 2-3 inches.

15. The system of claim 10, wherein the fastener is an arc band.

16. A method of making a non-pneumatic tire, the method comprising:
   providing an upper band;
   providing an elastomeric tread circumferentially about a top surface of the upper band;
   securing a curing wrap about the elastomeric tread and the upper band;
   applying heat within the curing wrap to form an upper band and tread assembly;
   providing a support structure connected to a lower band; and
   affixing the upper band and tread assembly to the support structure.

17. The method of claim 16, further comprising applying pressure within the curing wrap.

18. The method of claim 16, wherein the affixing of the upper band and tread assembly to the support structure includes affixing the upper band to the support structure with an adhesive.

19. The method of claim 16, wherein the curing wrap is constructed of a material selected from the group consisting of butyl rubber, other rubber compounds, neoprene, polytene, and latex.

20. The method of claim 16, wherein the securing of the curing wrap about the elastomeric tread and the upper band includes securing the curing wrap with a strap.

* * * * *